US012147398B2

(12) United States Patent
Lahiri et al.

(10) Patent No.: US 12,147,398 B2
(45) Date of Patent: Nov. 19, 2024

(54) FRAMEWORK AND METHOD FOR CONSISTENT CROSS-TIER DATA VALIDATION

(71) Applicant: Oracle International Corporation, Redwood Shores, CA (US)

(72) Inventors: Tirthankar Lahiri, Palo Alto, CA (US); Srikrishnan Suresh, Belmont, CA (US); Beda Christoph Hammerschmidt, Palo Alto, CA (US); Adrian Daniel Popescu, Zurich (CH); Jesse Kamp, Castro Valley, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 99 days.

(21) Appl. No.: 18/115,629

(22) Filed: Feb. 28, 2023

(65) Prior Publication Data

US 2024/0119031 A1    Apr. 11, 2024

Related U.S. Application Data

(60) Provisional application No. 63/413,835, filed on Oct. 6, 2022.

(51) Int. Cl.
*G06F 16/00* (2019.01)
*G06F 16/21* (2019.01)
(Continued)

(52) U.S. Cl.
CPC ........ *G06F 16/212* (2019.01); *G06F 16/2365* (2019.01); *G06F 16/258* (2019.01)

(58) Field of Classification Search
CPC .. G06F 16/212; G06F 16/2365; G06F 16/252; G06F 16/258
See application file for complete search history.

(56) References Cited

U.S. PATENT DOCUMENTS

2008/0201234 A1   8/2008   Castro et al.
2016/0077853 A1   3/2016   Feng et al.

OTHER PUBLICATIONS

Felipe Pezoa, "Foundations of JSON Schema," WWW 2016, Apr. 11-15, 2016, ACM, pp. 263-273. (Year: 2016).*

(Continued)

*Primary Examiner* — Cheryl Lewis
(74) *Attorney, Agent, or Firm* — Hickman Becker Bingham Ledesma LLP; Brian Miller (57) ABSTRACT

A computer analyzes a relational schema of a database to generate a data entry schema and encodes the data entry schema as JSON. The data entry schema is sent to a database client so that the client can validate entered data before the entered data is sent for storage. From the client, entered data is received that conforms to the data entry schema because the client used the data entry schema to validate the entered data before sending the data. Into the database, the entered data is stored that conforms to the data entry schema. The data entry schema and the relational schema have corresponding constraints on a datum to be stored, such as a range limit for a database column or an express set of distinct valid values. A constraint may specify a format mask or regular expression that values in the column should conform to, or a correlation between values of multiple columns.

20 Claims, 4 Drawing Sheets

(51) Int. Cl.
*G06F 16/23* (2019.01)
*G06F 16/25* (2019.01)

(56) References Cited

OTHER PUBLICATIONS

Adam Agocs et al., "A Web Service Based On RESTful API and JSON Schema/JSON Meta Schema To Construct Knowledge Graphs," IEEE 2018, pp. 1-5. (Year: 2018).*
Obinna Ethelbert et al., A JSON Token-Based Authentication and Access Management Schema For Cloud SaaS Applications, 2017 IEEE 5th International Conference on Future Internet of Things and Cloud, IEEE 2017, pp. 47-53. (Year: 2017).*
Wright, A., et al., "JSON Schema Validation: A Vocabulary for Structural Validation of JSON", https://json-schema.org/draft/2020-12/json-schema-validation.html. IETF, published Jun. 16, 2022, 23pgs.

* cited by examiner

FRAMEWORK AND METHOD FOR CONSISTENT CROSS-TIER DATA VALIDATION

PRIORITY CLAIM

This application claims the benefit of Provisional Application 63/413,835, filed Oct. 6, 2022, the entire contents of which is hereby incorporated by reference as if fully set forth herein, under 35 U.S.C. § 119(e).

FIELD OF THE INVENTION

The present invention relates to validation of entered data. More specifically, techniques are described that involve using a relational schema of a database to generate a client-agnostic schema that describes rules for consistently validating entered data on any client before storing the entered data in the database.

BACKGROUND

Relational databases succeed largely because they centralize a data model, thus supporting uniform application semantics. This has worked well for over 40 years, but a classic relational schema is now becoming insufficient to address needs of rich application semantics that increasingly are being implemented in the application tier, not in a database. This makes the database more of a passive container that provides data storage and data access and manipulation while application semantics migrate out of the database and into tools and microservices. Due to the diverse ecosystem of client implementations, this new division of responsibilities may cause divergence between modules, non-standard implementations, increased overall architectural complexity, and reduced efficiency. For example, complex rules for validating data that is stored in a particular table may be implemented and enforced by a particular client application. If that same data is accessed by a different client application or microservice, the other client may make changes that cause the data to violate the validation rules. To prevent this, the same validation logic may be implemented and executed by the other client, thus duplicating effort and increasing the likelihood of inconsistencies.

To avoid unnecessary duplication of client-implemented validation rules, the validation function may be centralized on the server-side. Databases servers provide extremely sophisticated mechanisms (e.g. data types with length limits, check constraints, referential constraints, etc.) to ensure cleanliness and integrity of stored data. However, that data integrity framework is present only within the database tier.

Unfortunately, performing validation in the database tier also has drawbacks. Specifically, when validation is performed at the server-side, client applications can still generate malformed input that the database rejects. For example, a user may use the client to fill in a complex and detailed form. Only after the form is completely filled out and finally submitted to the database server is the user informed that a validation error occurred. Thus, performing server-side validation may result in wasteful database accesses as well as user aggravation due to entering data into a UI form, submitting the entered data, and then receiving a web page that alerts all fields in the form that failed database side validation. For this reason, client applications often do implement their own, independent validation mechanisms to sanity check input data so that malformed inputs can be rejected right away. The problem with this approach is that nothing prevents applications-side rules and server-side rules from diverging or divergence across different application modules and micro services.

This trend to move validation rules into the application has a number of drawbacks:
  Causes validation semantics to diverge between applications and databases,
  Requires applications to reimplement validations across modules and microservices, and
  Complicates development and causes silos.

Today, applications and database have completely separate mechanisms to validate data. Databases use extremely sophisticated constraints which can have unbounded complexity and as such are not suitable for client-side evaluation. Applications have their own bespoke rules for validating client input data, and these rules can often diverge from the database and across modules and micro services. There is no current mechanism to ensure that user inputs are consistently verified within the application and in the database. For example because application and database rules may so readily diverge, some applications avoid adding database constraints altogether if they already perform client-side checking of entered data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is described a consistent cross-tier way to verify input data, within an application and within a database, using a same set of rules. In this approach, validation rules are declared centrally within the database and shared by all application modules. Further, techniques are described for communicating the rules to applications in a client-agnostic format to enable client-side enforcement of the constraints. Specific examples shall be given herein for using JavaScript object notation (JSON) as the client-agnostic format for specifying validation rules, but the techniques described herein are not limited to any particular client-agnostic format. Thus, embodiments are described that use JSON as a specification language for validation rules and schematic constraints, which differs fundamentally the conventional use of JSON as a payload transmission format.

Given a relational table definition and its associated constraints, a JSON representation is automatically generated that captures as many validation rules as possible for that table. A database client may obtain and use the generated JSON as a language-neutral, cross-tier input validation mechanism for data entered to be stored into that table.

In an embodiment, a computer analyzes a relational schema of a database to generate a data entry schema and encodes the data entry schema in a client-agnostic format (e.g. JSON). As used herein, a "data entry schema" is a structured set of data that describes validation rules, and maps the validation rules to specific locations within a database schema. The data entry schema is sent to a database client so that the client can validate entered data before the entered data is sent for storage into the database. From the database client, entered data is received that conforms to the data entry schema because the client used the data entry schema to validate the entered data before sending the data. Into the database, the entered data is stored that conforms to the data entry schema.

In an embodiment, the data entry schema and the relational schema have corresponding constraints on a datum to be stored, such as a range limit for a database column such as a minimum and/or maximum value or an express set of distinct valid values. A constraint may specify a format mask or regular expression, which values in the column should conform to, or a correlation between values of multiple columns in a same row of a relational table.

1.0 Example Database System

Figure 1:
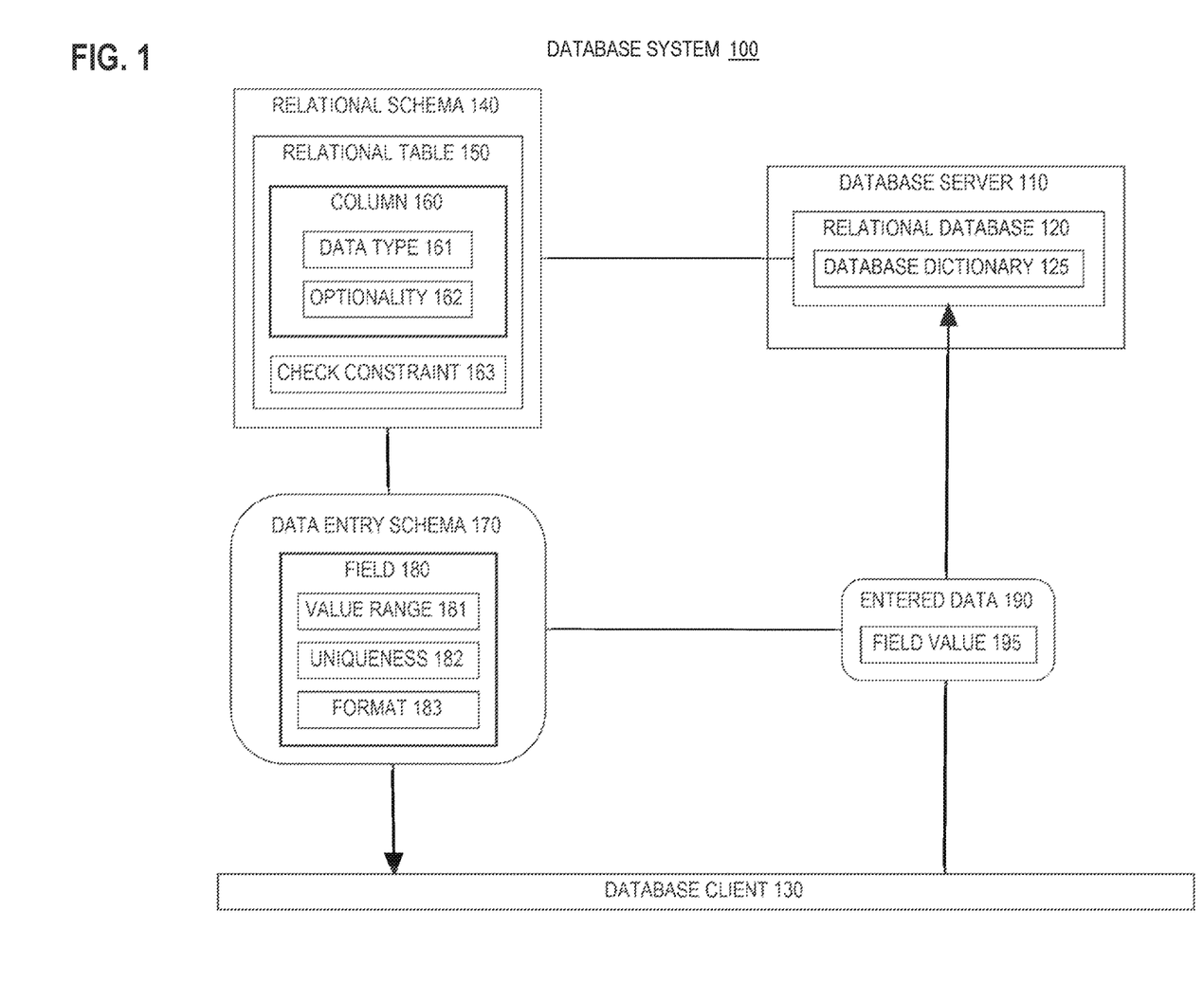
FIG. 1 is a block diagram that depicts an example database system that uses a relational schema of a database to generate a data entry schema that is a client-agnostic schema for validating entered data at a database client before storing the entered data into the database.

FIG. 1 is a block diagram that depicts an example database system 100, in an embodiment. Database system 100 uses relational schema 140 of database 120 to generate data entry schema 170 that is a client-agnostic schema for validating entered data 190 at database client 130 before storing entered data 190 in database 120. Database system 100 may be hosted by at least one computer such as a rack server such as a blade, a personal computer, a mainframe, a virtual computer, or other computing device. Database system 100 may contain a database management system (DBMS) that may contain one or more database servers, each of which may be middleware such as database server 110. Database server 110 may contain and operate one or more relational databases such as relational database 120.

1.1 Relational Database Schema

Relational schema 140 may define relational database 120. Relational schema 140 is demonstratively shown as outside of relational database 120 and database server 110 to demonstrate that relational schema 140 may or may not be external to relational database 120 and may or may not be external to database server 110 as discussed later herein. In one example, relational schema 140 is stored in database dictionary 125 in database 120. A database dictionary is a database metadata container as discussed later herein.

Relational schema 140 may define one or more relational tables such as relational table 150 that contains one or more table columns such as column 160 that stores values of data type 161 such as numbers or text strings. Database server 110 rejects any attempt to store a value of a particular data type into column 160 if the particular data type is not data type 161 of column 160. Column 160 may be optional or required as indicated by optionality 162 that indicates whether column 160 can or cannot store a null value that indicates no value.

1.2 Check Constraint

In addition to or instead of column constraints 161-162 that restrict what values can be stored in column 160, relational table 150 may have one or more CHECK constraints such as check constraint 163 that verifies contents of relational table 150. CHECK constraint 163 may specify one or more restrictions such as:
- a range limit for column 160 such as a minimum and/or maximum value or an express set of distinct valid values,
- a format mask or regular expression that values in column 160 must conform to,
- a correlation between values of multiple columns in a same row of relational table 150, and
- a custom condition such as permitting only prime numbers.

A CHECK constraint may be implemented with a same or similar predicate expression grammar as used in filtration queries to database server 110, such as a filter in a WHERE clause of a SELECT query in structured query language (SQL). Thus, a CHECK constraint may be very expressive and complex, such as a compound expression that contains multiple expression operators that each expect multiple arguments such as so-called binary operators such as logical (i.e. Boolean) operators and relational operators such as for applying relational algebra. Likewise, the CHECK constraint may invoke a user defined function (UDF) that has a complex and computationally-intensive implementation.

An implementation of a UDF may or may not be opaque such that the implementation is difficult or impossible to analyze. For example, a UDF may be implemented only as so-called object code consisting of sequence(s) of instructions of an instruction set architecture (ISA) of a central processing unit (CPU). In that case, database server 110 can execute the UDF but might be unable to analyze the instructions that implement the UDF. For example, database server 110 may apply a CHECK constraint that invokes a UDF having opacity that prevents database server 110 from discovering the logical nature of the CHECK constraint due to the CHECK constraint's reliance on the opaque UDF. For example, in some cases it may be more or less infeasible for database server 110 to fully model the CHECK constraint or to generate an approximation of the CHECK constraint such as for sending the approximation to database client 130 as discussed later herein.

1.3 Relational Schema Specified in DDL Statement(s)

Relational schema 140 and/or any of schematic details such as relational table 150, column 160, and constraints 161-163 may be individually or collectively defined by one or more data definition language (DDL) statements as discussed later herein. The following is an example DDL statement that defines an example relational table that contains example columns that have example column constraints.

```
CREATE TABLE Product(
    Id NUMBER NOT NULL PRIMARY KEY,
    Name VARCHAR2(50) NOT NULL,
    Category VARCHAR2(10) NOT NULL
        CHECK (CATEGORY IN ('Home', 'Apparel'))
    Price NUMBER NOT NULL CHECK (Price > 0)
);
```

1.4 Client and Server

If relational database 120 contains relational table 150, then database client 130 may send entered data 190 to database server 110 for storage into relational table 150. Database client 130 is a software application that may or may not share a memory address space with database server 110 and may or may not reside on a same computer as database server 110. For example, database server 110 may be embedded within database client 130, together in an operating system (OS) process, or may reside in separate processes that use inter-process communication (IPC) to cooperate. Cooperation of database client 130 and database server 110 may use a client-server database protocol such as open database connectivity (ODBC) or Java ODBC (JDBC).

1.5 Interactive Data Entry

Entered data 190 may be any information that enters database system 100 through database client 130 and that is data not automatically generated within database client 130 itself. For example, entered data 190 may be interactively (i.e. manually) entered into database client 130 or may be received by database client 130 from an external automated source. For example, an external system may use database client 130 for storing data into relational database 120. In either case, the entered data may be more or less unreliable (i.e. invalid). For example, the entered data might not conform to constraints 161-163 as required for storage into relational table 150.

Entered data 190 can be stored into relational database 120 only if entered data 190 conforms to relational schema 140. One goal of database system 100 is for database client 130 to ensure that entered data 190 is valid before sending entered data 190 to database server 110 for storage. Due to separation of concerns as a design principle, database client 130 is not expected to obtain, understand, and directly enforce relational schema 140. For example, relational schema 140 may be unavailable to database client 130, or relational schema 140 may be expressed in a domain-specific language (DSL) such as DDL that database client 130 might not understand.

1.6 Data Entry Schema

Instead, database client 130 obtains data entry schema 170 that represents some limited aspects of relational schema 170 but is not itself a relational schema and is expressed in an open and standardized format that can be processed regardless of the subject matter of database client 130 and regardless of the implementation of database client 130. In other words, data entry schema 170 is application agnostic and platform agnostic.

Data entry schema 170 is (e.g. textually) encoded in a client-agnostic format. For the purpose of explanation, examples shall be given wherein data entry schema 170 is encoded as JavaScript object notation (JSON) that is a data interchange format that can express structured and nested data. Most or all web browsers natively support JavaScript, which provides two benefits. First, a web browser can readily parse data entry schema 170 because JSON conforms to JavaScript's grammar and syntax, which means that any JavaScript application or browser application can process data entry schema 170. Second, database client 130 may be readily implemented in a web browser by implementing database client 130 in JavaScript.

JSON parsing also is commonplace in general purpose programing languages such as Java, C#, C++, and Python. The JSON grammar and syntax are internationally standardized, and incorporated herein by reference in its entirety is the standard itself, "ECMA-404: The JSON data interchange syntax", 2nd edition, December 2017 published by European Computer Manufacturers Association (ECMA).

Data entry schema 170 is automatically generated from relational schema 140. For example, database server 110 may generate data entry schema 170 and send data entry schema 170 to database client 130. Data entry schema 170 is an open (i.e. implementation agnostic) artifact that any database client may obtain, interpret, and apply to entered data for validation before sending the entered data to database server 110.

1.7 Impact on Client from Validation by Server

For example, entered data 190 contains field value 195 that database client 130 may attempt to store into column 160 by sending entered data 190 to database server 110 in a data manipulation language (DML) statement such as SQL's INSERT or UPDATE statements. If field value 195 does not conform to constraints 161-163, then database server 110 may reject entered data 190, which may be troublesome for a user of database client 130. For example if field value 195 is invalid because it does not conform to all of database constraints 161-163, then the DML statement may be rejected by database server 110 without database server 110 performing query planning.

A technical challenge is that a user interface screen that was used for interactive entry of entered data 190 might be reset to empty entry fields or might no longer be displayed when database server 110 rejects entered data 190. Entered data 190 may contain many field values that were entered in a sequence of various screens, and it might be difficult to return to the particular screen in the sequence for reentry of a particular field whose entered value is invalid. For example, database server 110 may indicate, to database client 130, that entered data 190 was rejected but might not indicate which of entered data 190's many entered fields has an invalid value.

1.8 JSON Generation for Validation by Client

Data entry schema 170 avoids those interactivity problems by using two operational phases as follows. The first phase generates data entry schema 170 from a portion or entirety of relational schema 140. For example, any of schema components 150, 160, and 161-163 may be expressly excluded from translation into data entry schema 170. For example, column 160 may have a flag that expressly indicates that column 160 is included or excluded for generation of data entry schema 170. Likewise, some schema components may be implicitly excluded for generation of data entry schema 170, such as if at least a portion of CHECK constraint 163 is opaque or otherwise unsupported for translation into data entry schema 170.

Generation of data entry schema 170 may entail processing schema components 150, 160, and 161-163 and translating some or all of those components into corresponding components in data entry schema 170. For example, field 180 may be generated from column 160, and other fields within data entry schema 170 may be generated from same column 160 or other columns in same relational table 150 or other relational tables in relational schema 140. Because data entry schema 170 is encoded in JSON that supports compound (i.e. multi-field) and nested data structures, related fields may be logically arranged in data entry schema 170 into groups. For example, data entry schema 170 may contain a distinct JSON object for each relational table whose columns have corresponding fields in data entry schema 170.

For example, field 180 may itself be a JSON object that is nested, along with other JSON objects for other fields that represent other columns in relational table 150 in addition to column 160, in another JSON object that corresponds to relational table 150. However, there is no requirement that schemas 140 and 170 have a same schematic normalization. For example, relational schema 140 may have multiple relational tables arranged as a multidimensional master-detail pattern such as a star or snowflake, but data entry schema 170 may instead contain a flattened set of fields without imposing any nesting or grouping.

1.9 Translating Constraint Semantics

Some constraints in relational schema 140, such as column constraints 161-162, may translate more or less directly into corresponding constraints in data entry schema 170. For example, data type 161 may specify that column 160 only stores numbers, and a corresponding numeric constraint may be generated in data entry schema 170 for field 180.

Semantics of field constraints 181-183 are as follows. If data type 161 has values that can be naturally ordered, such as numerically or lexically, then value range 181 may specify upper and/or lower bounds (i.e. value limits) for field value 195, and each limit may expressly be an inclusive or exclusive limit. Value range 181 may instead specify a set of valid distinct individual values, and all other values of data type 161 are forbidden for field value 195. Format 183 may specify a pattern, mask, or regular expression that field value 195 should conform to, such as the format of a phone number or email address. Data entry schema 170 may contain constraints that each specify any of:

a regular expression,
a limit on a count of array elements,
a limit on a count of array elements that match a criterion,
a limit on a count of fields of a JSON object in data entry schema 170,
an indication that elements of an array should be distinct, and
an indication that a limit value is inclusive or exclusive.

Data entry schema 170 may contain a version identifier (e.g. from a sequence of monotonically increasing numbers or timestamps). In an embodiment, the version identifier of data entry schema 170 is based on at least one of: a version identifier of relational schema 140 and a unique identifier automatically generated when data entry schema 170 is generated.

Data entry schema 170 may be automatically regenerated when relational schema 140 is modified so that data entry schema 170 is based on a latest version of relational schema 140. Each regeneration of data entry schema 170 may contain a new distinct version identifier. In an embodiment, database server 110 may be optionally configured to reject entered data 190 if entered data 190 does not contain the version identifier of the latest regeneration of data entry schema 170.

In JSON, a field may be an array that contains multiple values. If field 180 represents an array whose multiple values are provided as elements in field value 195, then uniqueness 182 requires that field value 195 not contain duplicates, which is not the same as requiring that column 160 not contain duplicates. For example, column 160 may contain data for many users, and uniqueness may be required only within a user's data, but not across all users' data. In that case, field value 195 may be an array of multiple values for one user and should not contain duplicates, but column 160 may contain duplicates so long as each duplicate of a same value is stored for a different respective user.

The following contains example field constraints, for example fields. Each example field corresponds to a respective example column in the example DDL statement presented earlier herein. The example fields and example field constraints are encoded as JSON in the following example data entry schema.

```
{"title": "Product",
  "type": "Object",
    "properties": {
      "Id": {"type": "number" },
      "Name": {"type": "string", "MaxLength":"50"},
      "Category":{"type": "string", "enum": ["Home",
      "Apparel"],"MaxLength":"10"]},
      "Price":{"type":"number", "ExclusiveMinimum":"0"}
    }
    "required": ["Id", "Name", "Category", "Price"]
}
```

In the above example data entry schema, field "Category" is required and nested as one of the "properties" of a "Product". A valid category field value must be a string of at most ten characters and must be exactly one of enumerated literals "Home" or "Apparel". To generate the above example data entry schema, field names and types are inferred from table column definitions. A string length limit (maxLength) of a field is inferred from varchar or char length of a table column. Field constraints such as enum and minimum/maximum checks are inferred from CHECK constraints of table columns. A list of required fields is inferred from NOT NULL constraints of table columns.

1.10 JSON Precheck Constraint

In an embodiment, standard SQL DDL syntax is enhanced to express the following novel example constraint that is a CHECK constraint.

CONSTRAINT <name> CHECK WITH JSON PRE-CHECK (cond1 AND cond2 AND . . . condN)

For column 160, the above example constraint has the following novel features. "CONSTRAINT <name>" means that the constraint is itself a first class database object that can be individually identified, referenced, and processed such as in ways presented herein. Each of cond1-condN may reference a same or different respective one column.

The above "JSON PRECHECK" expressly means that the constraint should be used for generating data entry schema 170, but the constraint is not necessarily enforced by database server 110. In other words, contents in column 160 need not conform to this novel constraint. Herein, a PRECHECK specifies the applying of data entry schema 170 to entered data 190 by database client 130. Optionally, database server 110 may also enforce the PRECHECK when receiving entered data 190 from database client 130.

Database server 110 may provide a built-in function or UDF, and when database server 110 receives entered data 190, optionally invoking the function causes applying: a) data entry schema 170 to entered data 190 or b) a particular field constraint such as value range 181 to field value 195. Herein, applying schema 140 or 170 respectively to stored or entered data may be referred to as validating the data with the schema.

1.11 Constraint Processing by Client

As explained above, the first operational phase generates data entry schema 170, after which the second operational phase may immediately or eventually follow, which entails database client 130 using data entry schema 170 to validate entered data 190 before sending entered data 190 to database server 110. For example, database client 130 may have a more or less hard-coded mapping between particular fields in data entry schema 170 and particular user interface widgets displayed in a screen. For example, field 180 may represent a time type, and database client 130 may map field 180 to a text entry widget into which a user may enter a time as a text string. For example, fields in data entry schema 170 may have identifiers, and data entry widgets may have their own identifiers. Database client 130 may have a mapping from the respective identifier of each field in data entry schema 170 to an identifier of a respective corresponding widget.

In another example, database client 130 lacks predefined user interface screens and instead processes data entry schema 170 to dynamically generate corresponding screen(s). For example, database client 130 may detect that field 180 represents a time type and generate a corresponding widget for entry of a time value. A dynamically generated widget may be generalized for any data type 161 such as a text entry widget, or may be specialized for a particular data type. For example, a date may be entered into a calendar widget.

1.12 Data Entry Schema Conforms to Json Schema Standard

JSON, by itself, can specify complex data structures but lacks an expression syntax to traverse those data structures. Basic data processing such as filtration and validation are absent in JSON as a notational standard. Data entry schema 170, although encoded entirely in JSON that lacks expressions, can contain expressions such as regular expressions and/or compound expressions composed of expression operators having predefined semantics.

In an embodiment, data entry schema 170 is JSON that conforms to the Internet engineering task force's (IETF) JSON Schema, even though JSON was originally created for use without a schema and techniques herein do not need to apply a schema to data entry schema 170. The above example data entry schema is encoded as JSON that conforms to JSON Schema. Incorporated herein by reference in its entirety is "JSON Schema Validation: A Vocabulary for Structural Validation of JSON" published by the IETF on Jun. 10, 2022.

1.13 Standardized Constraint Semantics

JSON Schema may provide standardized semantics for field constraints 181-183. For example, uniqueness 182 may be encoded using JSON Schema's "uniqueItems" keyword, and data entry schema 170 may have constraints that encode with any of JSON Schema's rich vocabulary of so-called validation keywords, which have standardized semantics that data entry schema 170 and database client 130 can leverage. In that case, any application that understands JSON Schema can fully and automatically use data entry schema 170 to validate entered data 190.

The following is an example mapping of DDL CHECK conditions to JSON Schema validations (i.e. field constraints). This example mapping may be used to generate data entry schema 170 from relational schema 140. In this example mapping, <value> is always a literal and never an expression nor a reference to a different column.

| CHECK condition | JSON Schema Validation |
|---|---|
| (column >= <value>) | "Minimum" : "<value>" |
| (column <= <value>) | "Maximum" : "<value>" |
| (column > <value>) | "ExclusiveMinimum" : "<value>" |
| (column < <value>) | "ExclusiveMaximum" : "<value>" |
| (column BETWEEN <val1> AND <val2>) | "Minimum" : "<val1>", "Maximum" : "<val2>" |
| (MOD(col, <value>) = 0) | "MultipleOf" : "<value>" |
| (Regexp_like(col, <regex pattern>)) Note: verifies that this pattern is JSON schema regex compatible | "Pattern" : "<regex_pattern>" |
| (Length(column) <= <length>) | "maxLength" : "<length>" |
| (Length(column) >= <length>) | "minLength" : "<length>" |
| (column IN (<val1>, <val2>, ... <valN>)) | "enum" : ["val1", "val2", ... "valN"] |
| (col = <val1> OR col = <val2> ... OR col = <valN>) | "enum" : ["val1", "val2", ... "valN"] |
| (column = <value>) | "const" : "<value>" |

1.14 Data Type Translation

The following is an example mapping of SQL column types to JSON field types. This example mapping may be used to generate data entry schema 170 from relational schema 140.

| Column Type | JSON Type | Notes |
|---|---|---|
| [N]VARCHAR2, [N]CHAR, [N]CLOB | "String" | For VARCHAR2/CHAR the length will also generate a maxLength property if there is no other length constraint on the column. If the length is specified in Bytes, maybe maxLength converts it to chars based on (max) character width?? |
| DATE, DATETIME, TIMESTAMP, TIMESTAMP WITH TIMEZONE, INTERVAL | "String" | JSON does not have a true Date type but a corresponding "format":"date", "format":"date-time", "format":"time", "format":"duration" property is also generated for the column (see https://json-schema.org/draft/2020-12/json-schema-validation.html#rfc.section.7.3.1 for standard json date formats) |
| NUMBER(M, N), BINARY_FLOAT, BINARY_DOUBLE | "Number" | |
| INTEGER or NUMBER(N, 0) | "Integer" | Number is used when the precision N is non-zero |
| BOOLEAN (new in 23c) | "Boolean" | Note that Oracle does not have a true INTEGER type but an INTEGER declaration or a number with a precision of Zero is mapped to JSON Integer |
| JSON, XMLType | "Object" | |
| BLOB, RAW, LONG, LONG RAW | "String" | JSON and XML Columns represent objects |

1.15 Predefined Format and Format Function

Data entry schema 170 is a semi-structured document. However except as shown in the above example mapping, data entry schema 170 does not contain extensible markup language (XML) and relational database 120 does not store XML.

Without JSON Schema, data entry schema 170 may have any predefined validation semantics for which database server 110 can generate representations into data entry schema 170, so long as database client 130 can enforce those semantics by interpreting data entry schema 170. JSON Schema provides predefined and composable validation semantics that may be declaratively arranged and configured in data entry schema 170. Client and server in database system 100 may adopt JSON Schema as discussed herein, or may instead agree on other predefined semantics, which may be more or less arduous for multiple parties to agree on. In either way, data entry schema 170 can be generated and enforced as discussed herein.

The following are example functions that may be invoked in PRECHECK conditions. As explained earlier herein, PRECHECKS are executed by database client 130 and, afterwards, optionally executed by database server 110. Thus, there may be two executions of a same PRECHECK for same field value 195. However, both executions may use different implementations of the same PRECHECK. The following example functions may be implemented as JavaScript for use by database client 130 and instead implemented as built-in functions or as UDFs for use by database server 110. In an embodiment, the built-in function or UDF is a minimal wrapper that delegates to the JavaScript implementation, so long as database server 110 can execute JavaScript.

| PRECHECK constraint function | Description | Generated Property |
|---|---|---|
| IS_JSON_EMAIL(<col>) | Checks if col is a valid email | "format":"email" |
| IS_JSON_IPV4(<col>) | Checks if column is a valid ipv4 ipaddr | "format":"ipv4" |
| IS_JSON_IPV6(<col>) | Checks if column is a valid ipv6 ipaddr | "format":"ipv6" |
| IS_JSON_HOSTNAME(<col>) | Checks if column is a valid hostname | "format":"hostname" |
| IS_JSON_URI(<col>) | Checks if col is a valid uri | "format":"uri" |
| IS_JSON_UUID(<col>) | Checks if col is a valid uuid | "format":"uuid" |

The above example functions may be expressly referenced in format 183, so long as database client 130 can execute JavaScript. However, a preferred embodiment of format 183 does not reference an example function and does not require JavaScript on the client. Instead, format 183 is generated as a JSON property of field 180. For example as shown for the above example functions, the generated property may be named "format" and may have a value that identifies a predefined format. A predefined format is a complex format referenced solely by name and without arguments. In various embodiments, each predefined format is or is not implemented by the corresponding example function as shown above.

2.0 Example Data Entry Schema Generation Process

Figure 2:
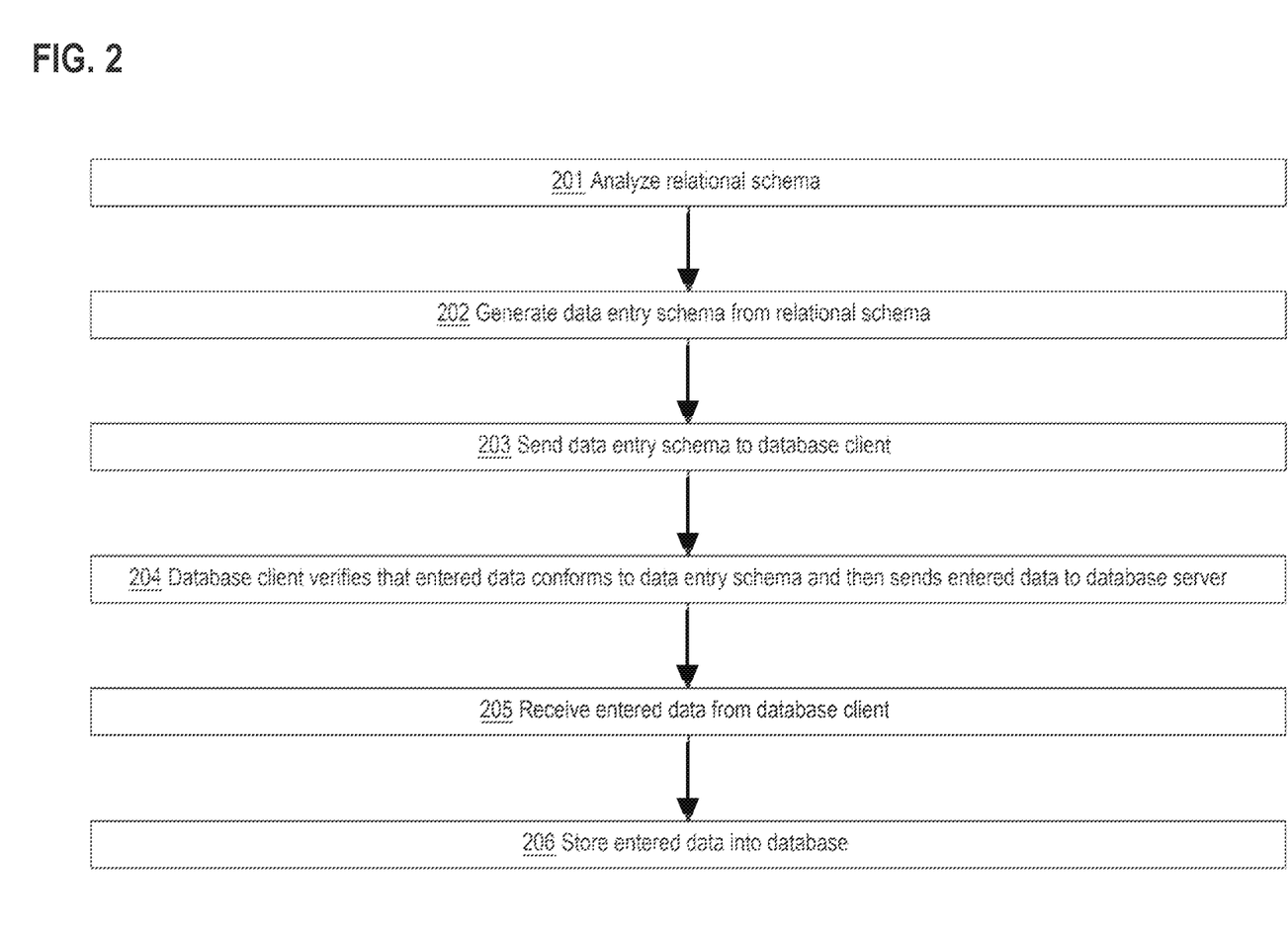
FIG. 2 is a flow diagram that depicts an example computer process that uses a relational schema of a database to generate a data entry schema that is a client-agnostic schema for validating entered data at a database client before storing the entered data into the database.

FIG. 2 is a flow diagram that depicts an example computer process that database system 100 may perform to use relational schema 140 of database 120 to generate data entry schema 170 that is a client-agnostic schema for validating entered data 190 at database client 130 before storing entered data 190 into database 120, in an embodiment. FIG. 2 is discussed with reference to FIG. 1. The following three example embodiments each use a different respective component of FIG. 1 to perform the process of FIG. 2. As follows, the three embodiments each uses a different respective way of obtaining relational schema 140 for generating data entry schema 170.

In a first embodiment, database server 110 performs steps 201-203 and 205-206 by natively and directly accessing relational schema 140. In a second and a third embodiments, a respective component other than database server 110 generates data entry schema 170, which entails steps 201-202.

In the second embodiment, steps 201-202 are instead performed by database client 130 that accesses relational schema 140 by connecting to database server 110 that performs remaining steps 203-206.

In the so-called offline third embodiment that uses neither relational database 120 nor database server 110, a software tool analyzes DDL statements (e.g. in a database administration script). The third embodiment generates data entry schema 170 by performing steps 201-202, and steps 203-206 are not performed. For example, the third embodiment works even if relational database 120 and database server 110 do not exist.

Step 201 analyzes relational schema 140 to discover tables, columns, and database constraints such as column constraints. Identifiers and configurations of all of those database objects are discovered by inspecting relational schema 140 that may be encoded as DDL statements or stored in a database dictionary. Database dictionaries are discussed later herein. Step 201 may iterate over the discovered tables, columns, and database constraints to disregard (i.e. not process) database objects that expressly should not or implicitly cannot be translated into portions of data entry schema 170.

Step 202 generates data entry schema 170 from relational schema 140. Step 202 may iterate over the discovered tables, columns, and database constraints to generate corresponding portions of data entry schema 170 as discussed earlier herein.

Step 203 sends data entry schema 170 to database client 130. For example, database client 130 may request that database server 110 perform step 203. For example, database client 130 may send a representational state (REST) request or other hypertext transfer protocol (HTTP) request to database server 110 to request a copy of data entry schema 170, so long as database server 110 contains a web server.

In the first embodiment and the second embodiment, database client 130 performs step 204. In step 204, database client 130 verifies that entered data 190 conforms to data entry schema 170 and then sends verified entered data 190 to database server 110. Step 204 may be caused when entered data 190 is interactively entered as input into database client 130, which may involve a user interface screen, a web page in a web browser, or a command line.

In step 205, database server 110 receives entered data 190 from database client 130. For example, database server 110 receives a DML statement that contains entered data 190. The DML statement may specify writing field value 195 into column 160. Database client 130 may contain a database driver that generates the DML statement that is a plain text statement that can be generated and/or sent by database client 130 with or without a database driver. Of course before sending entered data 190, database client 130 should successfully validate entered data 190 using data entry schema 170.

Step 206 stores entered data 190 into relational database 120. For example while executing the DML statement, database server 110 may store field value 195 into column 160. Before storing entered data 190, step 206 verifies that entered data 190 conforms to relational schema 140. If that validation fails, storing entered data 190 by step 206 does not occur. For example, the DML statement is rejected without executing it.

2.1 First Example Activity

The following example activities A1-A3 demonstrate behaviors that database server 110 may or may not implement and perform. Activity A1 is an optional (e.g. redundant) validation as discussed earlier herein and can be skipped (i.e. not performed). Activity A1 occurs between above steps 205-206 and decides whether or not to terminate the process of FIG. 2 without performing last step 206.

In activity A1, database server 110 detects whether or not entered data 190 conforms to data entry schema 170. If activity A1 detects that entered data 190 is invalid, then last step 206 is skipped and, for example, the DML statement is rejected without executing it. For example, validation of entered data 190 with data entry schema 170 by activity A1 may fail if entered data 190 instead came from a database client that lacks data entry schema 170, and that validation failure by activity A1 may occur even if entered data 190 would seem valid if instead compared to relational schema 140. Entered data 190 is invalid with respect to data entry schema 170 if entered data 190: a) contains an invalid field value, b) is missing a value of a required field, or c) contains a value for an invalid field such as an unrecognized field, a forbidden field, or too many fields in total.

2.2 Second Example Activity

Unlike activity A1, Activities A2-A3 entail behaviors that occur somewhat independent of the process of FIG. 2. Activity A2 demonstrates future proofing of database server 110 that the state of the art may unfortunately need to restart after rebuilding its codebase (e.g. to include a new data entry format for use in data entry schema 170). For example, an original equipment manufacturer (OEM) may include some data entry formats and accompanying implementation logic in database server 110 such as a timestamp format for a timestamp JSON field that can specify a date, a time, and a time zone. The implementation logic correctly accommodates leap year, which is infeasible to directly express in a format mask or regular expression. If a user desires a new data entry format that is not a stock data entry format provided by the OEM, then the user should provide a format mask, a regular expression, or accompanying implementation logic for the new data entry format. The new accompanying implementation logic should be added to database server 110's codebase. In the state of the art, modifying a database server's codebase requires restarting the database server.

Without requiring restarting database server 110, activity A2 adds a new data entry format to relational database 120. For example, the new data entry format's accompanying implementation logic may be contained in an Oracle PL/SQL package that database server 110 can dynamically add to relational database 120 without requiring restarting database server 110.

2.3 Third Example Activity

Example activity A3 effectively operates in reverse by generating a definition of a new relational table from a data entry schema. For example, the data entry schema may be preexisting and widely used, and a corresponding relational schema for a new database may be desired. Example activity A3 may: a) analyze a data entry schema to discover its elements (e.g. fields and field constraints) and their configuration and b) iterate over those elements to generate corresponding portions of DDL statement(s) that define the corresponding relational schema elements. Example A3 may generate a new relational schema or insert/replace elements in an existing relational schema. Example activity A3 may be: a) performed by database server 110 that may or may not also execute the DDL statements to actually create table(s) and columns, b) performed by a software tool that generates and sends the DDL statements to database server 110 for execution, or c) performed by an offline software tool that generates the DDL statements even if database server 110 does not exist.

3.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

3.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
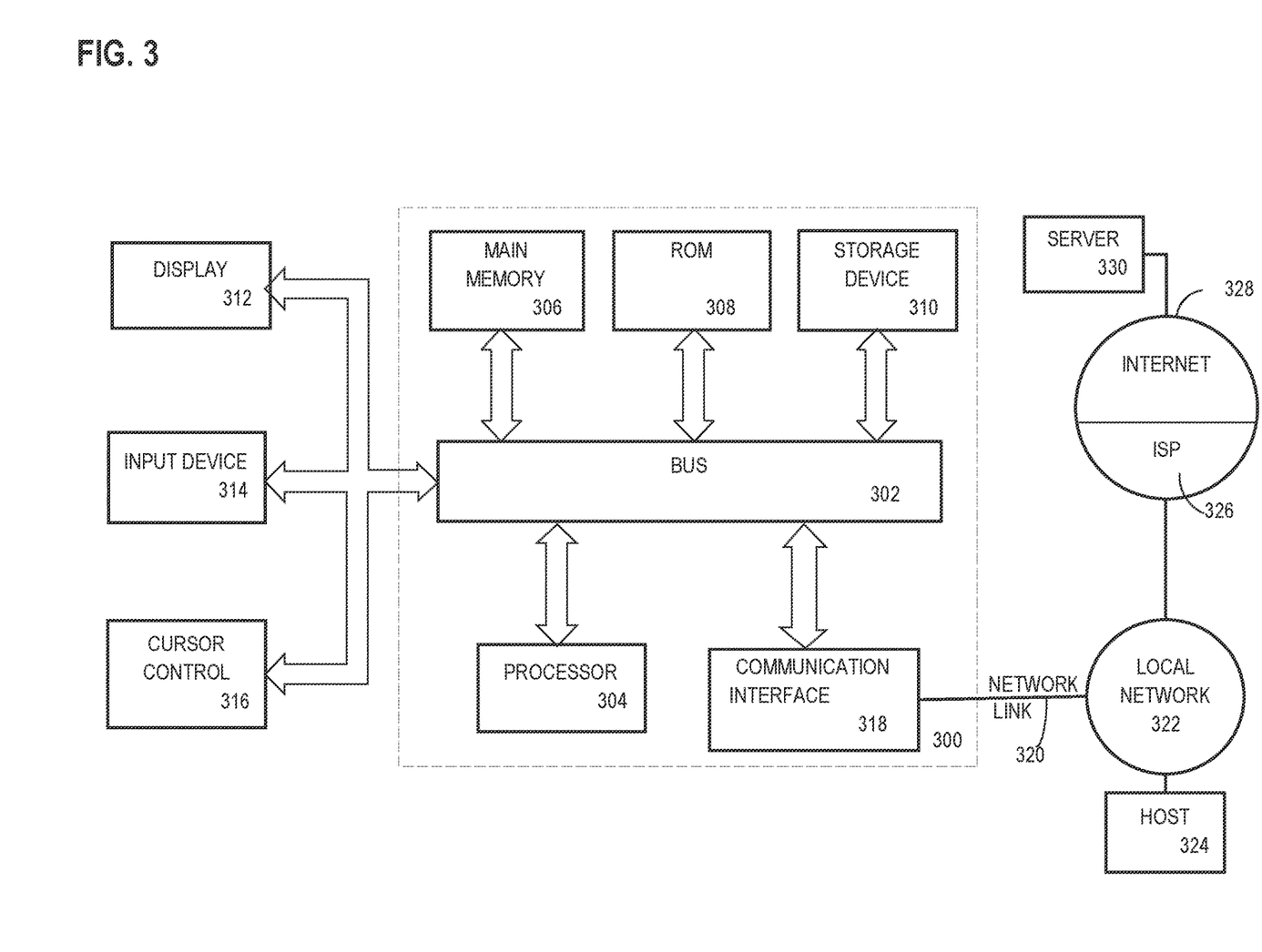
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
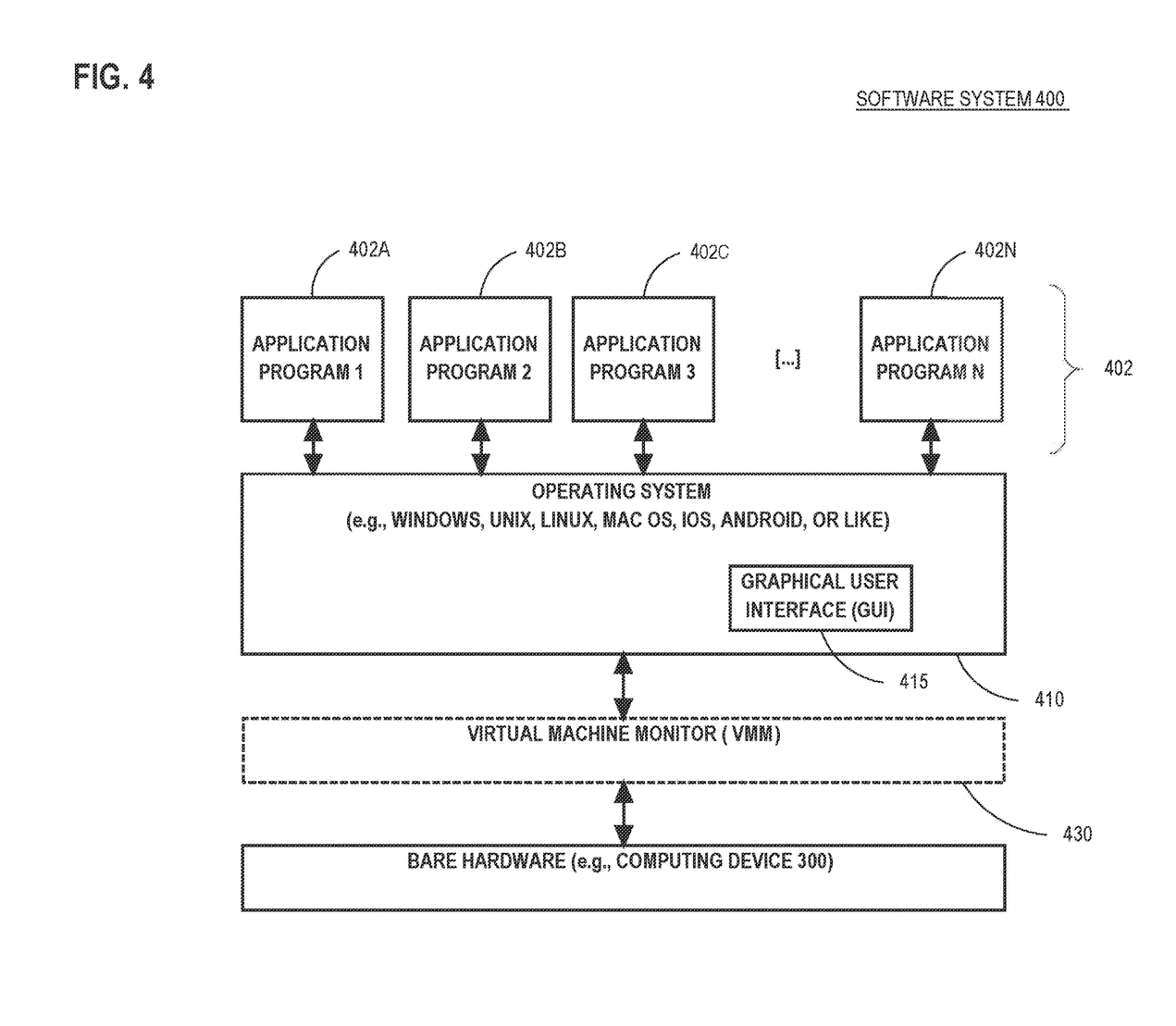
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 400 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, from a relational schema for a database, a data entry schema that is not a relational schema;
wherein the data entry schema encodes, in a client-agnostic format, one or more validation rules that apply to data that is to be stored at specific locations in the relational schema;

sending the data entry schema to a database client;
receiving, from the database client, entered data that the database client has validated, based on the data entry schema, as conforming to the data entry schema; and
storing, into the database, the entered data that conforms to the data entry schema.

2. The method of claim 1 wherein the one or more validation rules include a check constraint that is specified in the relational schema of the database.

3. The method of claim 2 wherein the check constraint contains at least one selected from a group consisting of:
a compound expression,
an expression based on a plurality of columns in the database, and
an indication of whether the check constraint should be used to generate the data entry schema.

4. The method of claim 1 wherein the data entry schema contains at least one selected from a group consisting of:
a version identifier,
a regular expression,
a limit on a count of object properties,
a limit on a count of array elements,
a limit on a count of array elements that match a criterion,
an indication that elements of an array should be distinct,
an indication that a limit value is inclusive or exclusive,
a specification for data entry of a time zone,
JavaScript object notation (JSON), and
JSON that conforms to a JSON Schema standard by Internet Engineering Task Force (IETF).

5. The method of claim 1 further comprising without requiring restarting a server of the database, adding a new data entry format to the database, wherein said generating the data entry schema is based on the new data entry format.

6. The method of claim 1 further comprising a server of the database detecting whether the entered data conforms to the data entry schema.

7. The method of claim 6 wherein:
the entered data conforms to the relational schema of the database;
said detecting whether the entered data conforms to the data entry schema comprises detecting that the entered data does not conform to the data entry schema.

8. The method of claim 1 wherein said sending the data entry schema comprises using at least one selected from a group consisting of representational state (REST) and hypertext transfer protocol (HTTP).

9. The method of claim 1 wherein:
said sending the data entry schema comprises sending a semi-structured document from a server of the database;
extensible markup language (XML) is not contained in at least one selected from a group consisting of the relational schema of the database and the data entry schema.

10. The method of claim 1 further comprising generating a definition of a relational table from a data entry schema that is not a relational schema.

11. A method comprising:
generating, from a relational schema for a database, a data entry schema that is not a relational schema, wherein:
said generating the data entry schema is not performed by a database server, and
the data entry schema encodes, in a client-agnostic format, one or more validation rules that apply to data that is to be stored at specific locations in the relational schema;
receiving, from a database client, entered data that the database client has validated, based on the data entry schema, as conforming to the data entry schema; and
storing, into the database, the entered data that conforms to the data entry schema.

12. The method of claim 11 wherein said generating the data entry schema comprises inspecting at least one selected from a group consisting of:
the relational schema of the database in a database dictionary, and
a set of one or more data definition language (DDL) statements.

13. The method of claim 11 wherein said database does not exist during said generating the data entry schema.

14. The method of claim 11 wherein said database client performs said generating the data entry schema.

15. One or more non-transitory computer-readable media storing instructions that, when executed by one or more processors, cause:
generating, from a relational schema for a database, a data entry schema that is not a relational schema, wherein:
said generating the data entry schema is not performed by a database server, and
the data entry schema encodes, in a client-agnostic format, one or more validation rules that apply to data that is to be stored at specific locations in the relational schema;
receiving, from a database client, entered data that the database client has validated, based on the data entry schema, as conforming to the data entry schema; and
storing, into the database, the entered data that conforms to the data entry schema.

16. The one or more non-transitory computer-readable media of claim 15 wherein said generating the data entry schema comprises inspecting at least one selected from a group consisting of:
the relational schema of the database in a database dictionary, and
a set of one or more data definition language (DDL) statements.

17. One or more non-transitory computer-readable media storing instructions that, when executed by one or more processors, cause:
generating, from a relational schema for a database, a data entry schema that is not a relational schema;
wherein the data entry schema encodes, in a client-agnostic format, one or more validation rules that apply to data that is to be stored at specific locations in the relational schema;
sending the data entry schema to a database client;
receiving, from the database client, entered data that the database client has validated, based on the data entry schema, as conforming to the data entry schema; and
storing, into the database, the entered data that conforms to the data entry schema.

18. The one or more non-transitory computer-readable media of claim 17 wherein said generating the data entry schema is based on a check constraint in the relational schema of the database.

19. The one or more non-transitory computer-readable media of claim 17 wherein the data entry schema contains at least one selected from a group consisting of:
a version identifier,
a regular expression,
a limit on a count of object properties,
a limit on a count of array elements,
a limit on a count of array elements that match a criterion, an indication that elements of an array should be distinct,
an indication that a limit value is inclusive or exclusive,
a specification for data entry of a time zone,
JavaScript object notation (JSON), and
JSON that conforms to a JSON Schema standard by Internet Engineering Task Force (IETF).

20. The one or more non-transitory computer-readable media of claim 17 wherein:
said sending the data entry schema comprises sending a semi-structured document from a server of the database;
extensible markup language (XML) is not contained in at least one selected from a group consisting of the relational schema of the database and the data entry schema.

* * * * *